(12) United States Patent
Grandi

(10) Patent No.: US 6,220,338 B1
(45) Date of Patent: Apr. 24, 2001

(54) INSTALLATION FOR THE COLD STORAGE WITH LOCALIZED REHEATING OF FOOD ON MEAL TRAYS

(75) Inventor: Rene Vincent Grandi, Campione d'Italia (IT)

(73) Assignee: Italinnova S.A.S., Campione d'Italia (IT)

( * ) Notice: Subject to any disclaimer, the term of this patent is extended or adjusted under 35 U.S.C. 154(b) by 0 days.

(21) Appl. No.: 09/423,219
(22) PCT Filed: May 12, 1998
(86) PCT No.: PCT/FR98/00946
 § 371 Date: Dec. 3, 1999
 § 102(e) Date: Dec. 3, 1999
(87) PCT Pub. No.: WO98/53260
 PCT Pub. Date: Nov. 26, 1998

(30) Foreign Application Priority Data

May 12, 1997 (FR) .................................................. 97.05890

(51) Int. Cl.[7] .................................................... F25B 29/00
(52) U.S. Cl. ........................ 165/48.1; 165/919; 312/236
(58) Field of Search ................................... 165/48.1, 918, 165/919; 312/236

(56) References Cited

FOREIGN PATENT DOCUMENTS

| 2 391 687 | * | 12/1978 | (FR) . |
| 2 594 317 | * | 8/1987 | (FR) . |
| 2 594 942 | * | 8/1987 | (FR) . |
| 90/02509 | * | 3/1990 | (WO) . |

* cited by examiner

Primary Examiner—Ira S. Lazarus
Assistant Examiner—Ljiljana V. Ciric
(74) Attorney, Agent, or Firm—Oliff & Berridge, PLC

(57) ABSTRACT

An installation comprising a cupboard with a top section providing an assembly of cold units, and a preserving section provided with insulating shelves and trays with through slots for placing containers thereon. Each insulating shelf comprises, in each zone supporting the container base of the meal service trays, a tubular pipe exchanger connected to a cooling pipe circuit, while at least one heat exchanger on each shelf is associated with an electric heating unit, and the cold units assembly is a sealed chamber formed by and/or containing tubular heat exchanging pipes whereof the tubular networks are interconnected to each other and connected to a cooling pipe circuit.

14 Claims, 4 Drawing Sheets

INSTALLATION FOR THE COLD STORAGE WITH LOCALIZED REHEATING OF FOOD ON MEAL TRAYS

FIELD OF THE INVENTION

The invention relates to an installation for the cold storage of food in receptacles carried on meal trays with localized reheating of certain foods.

Cabinets and trolleys performing these functions in the catering field, in hospital environments, in aircraft, in trains and in boats, are already known.

DESCRIPTION OF THE RELATED ART

In current systems, cold storage is either accomplished by means of mechanical ventilated chilling, that is to say, using a stream of cold air generated by passing a stream of air over the evaporator of a refrigerating unit, or by means of carbon dioxide in the gaseous phase resulting from the sublimation of dry ice contained in a cold reservoir located in the upper part of a cabinet, or by means of heat pipe evaporators arranged around the sides of the trays while their condensers are in a cold reservoir.

Whichever of the above techniques is used, the heat is extracted from the receptacles that are to be cooled by the air contained in the storage compartment. This means that the entire volume of air in this compartment must be cooled and the result is a large refrigeration load, especially given the fact that overall efficiency is low owing to the various transfer of heat by conduction or convection.

To this is added the difficulty of keeping the temperature the same at each level in the compartment.

The food is reheated either by means of electrical resistors arranged in a support on which the dishes to be reheated are placed, or by a stream of hot air directed at the receptacles to be reheated, in which case the receptacles are placed in a division of the storage compartment.

Resistance heating produces too fierce a heat which can spoil the taste of the food and cause them to stick to the bottom of the dish. Heating with a stream of hot air is rarely even throughout the storage compartment and necessitates the creation, in this compartment, of the separation between the area of receptacles to be kept cold and the area of receptacles to be reheated.

Added to these drawbacks which affect the evenness of the cold storage and of the reheating are drawbacks inherent in the use of dry ice, namely the difficulty of precise release to achieve the desired cold storage by limiting the emission of carbon dioxide, difficulties in achieving an even and constant temperature at the different levels at which the meal trays in the storage compartment are disposed and, above all, the emission of carbon dioxide. This last drawback is particularly serious when it comes to cabinets or trolleys used in closed spaces having a limited volume, such as aircraft and passenger trains because, on journeys lasting several hours, the amount of carbon dioxide emitted reaches thresholds close to those dangerous to humans.

BRIEF SUMMARY OF THE INVENTION

It is an object of the present invention to overcome these drawbacks by providing a cabinet in which the refrigeration circuit keeps the food by reducing the intermediate transfers from the cold reservoir and limits the refrigeration demand, and hence the volume of the reservoir and the emission of carbon dioxide, if dry ice is used, and in which the reheating means provide a gentle temperature rise, sufficient to reheat the food without spoiling its taste.

The invention relates more particularly to an installation composed of, on the one hand, a cabinet comprising two superimposed compartments thermally insulated from the exterior, namely an upper compartment forming a cold reservoir, and a storage compartment fitted with shelves to hold the meal trays, and, on the other hand, with meal trays made of an insulating material with vertical through wells in which the receptacles containing the food can be positioned, each tray optionally having at least one insulating lid.

In the installation according to the invention, each shelf is thermally insulating and comprises, in each of its areas that support the base of the receptacles carried by the meal tray or trays which it supports a heat pipe tubular heat exchanger each heat exchanger being connected, by intermediate pipes, to the supply and return branches, respectively, of a refrigerating heat pipe circuit, while at least one of the heat exchangers in each shelf is provided with electrical heating means, and the cold reservoir consists of a leaktight box made up of tubular heat exchangers and/or heat exchangers containing tubular heat pipe heat exchangers whose tubular networks are interconnected and are connected, respectively, directly to the return branches of the refrigerating heat pipe circuit and, via a buffer tank that thermally homogenizes the cold working flow circulating around the heat pipe network, to the supply branches of this refrigerating circuit.

By means of this arrangement, the refrigerating power of the cold reservoir is taken by heat pipe heat exchangers and conducted very rapidly by the supply branches to the heat pipe heat exchangers located in the shelves, in contact with the bases of the receptacles. It is clear therefore that heat is transferred only via the heat pipe network and by direct conduction between this network and the bases of the receptacles, thus making it unnecessary for heat to be transferred by air which reduces heat transfer efficiency. The result is that the refrigeration load that has to be charged is reduced, which makes it possible to reduce the size of the reservoir and, if using dry ice, to reduce the emission of carbon dioxide by reducing the amount of dry ice taken on board and the refrigeration capacity required.

The reheating of the dishes also benefits from an improvement in the efficiency of the thermal transfer, as it is effected by a heat pipe heat exchanger in contact with the receptacle.

In one embodiment of the invention, the heat pipe heat exchangers contained in the leaktight box of the cold reservoir are composed of vertical tube bundles projecting up from manifolds radiating out around the buffer tank and descending toward this tank.

The tube bundles improve the exchanges with the cold working fluid or the dry ice placed in the cold reservoir.

As a preference, cold bodies each consisting of a hollow body, made of a leaktight material that is a good heat conductor, having a capacity of between 2 and 30 $cm^3$ and containing a eutectic liquid whose freezing point is below 0° C., are in suspension in a fluid having a freezing point lower than the liquid contained by the cold bodies, fill the cold reservoir so as to be in direct contact with the tube bundles which secure them and contain them.

In this application, which uses cold bodies capable of storing the maximum amount of latent heat in the minimum of space, the volume of the cold reservoir can be still further reduced, especially as the transfer of heat between the heat pipe tube bundles and the cold bodies occurs either directly or via the fluid in which they are suspended.

Advantageously, the walls of the upper compartment and of the leaktight box of the cold reservoir are traversed by two pipes that can be connected externally to the supply and return branches, respectively, of an installation for recharging the installation with refrigerating fluid cooled to a temperature below the freezing point of the fluid contained in the cold bodies, while the walls of the box support a number of approximately vertical internal plates projecting between the bundles so as to form baffles which define, with these bundles, a preferred circuit that forces the refrigerating fluid to circulate throughout the entire reservoir when the refrigerating capacity is being renewed.

Other features and advantages will be found in the description which follows with reference to the attached schematic drawing showing, by way of examples, several embodiments of this installation.

DETAILED DESCRIPTION OF THE DRAWINGS

Figure 1:
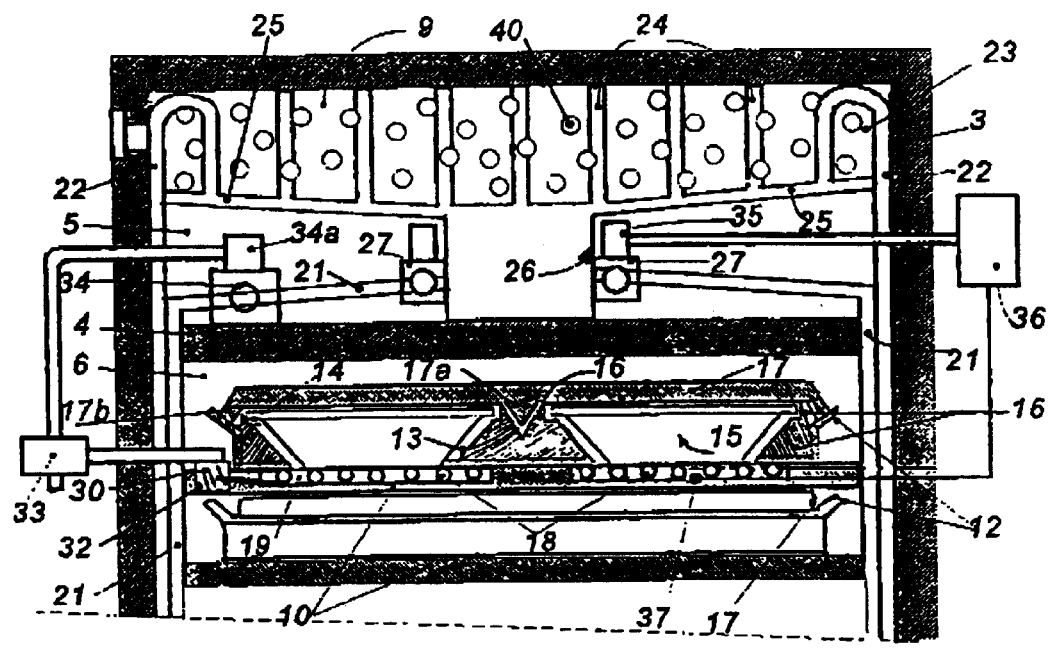
FIG. 1 is a partial view in vertical section of one embodiment of a cabinet.

In FIG. 1, the reference number 2 denotes a storage cabinet bounded by walls 3 made of a heat-insulating material, the internal cavity of which is divided, by an intermediate insulating wall 4, into an upper compartment 5 forming a cold reservoir 9, and a lower or storage compartment 6. In a cabinet 2, the storage compartment is provided with only one access door at the front, whereas in a trolley for use in aircraft such as that shown at 7 in FIG. 3 it has two doors 8 on opposite sides.

According to the invention the storage compartment 6 possesses shelves 10 which are spaced out at equal vertical intervals and are made from a heat-insulating material.

Figure 5:
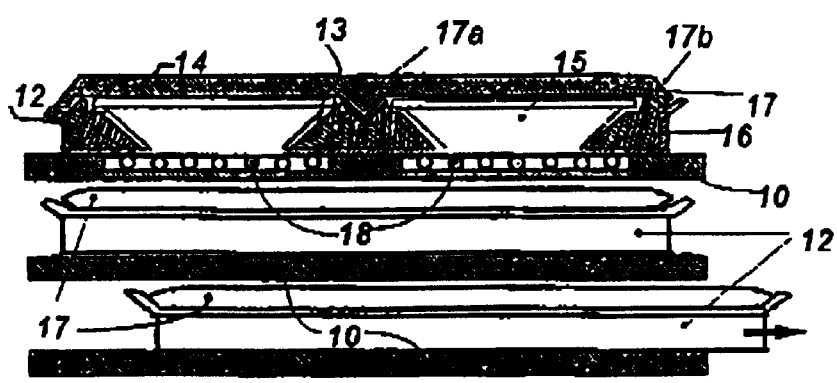
FIG. 5 is a partial view in partial section on V—V as marked in FIG. 4.

Each shelf is designed to take at least one tray which will be described with reference to FIG. 6. The tray 12, which is also made of a heat-insulating material, is traversed vertically by at least two vertical wells 13 with shoulders 14 around their inner perimeter for positioning the rims of the receptacles 15 which they are designed to take. FIG. 5 shows clearly that, when the receptacles 15 are placed in the wells 13, their base lies approximately in the plane of the base of the tray 12. Each well is surrounded by a barrier 16 which has a heat-insulating function and is designed to fit either an independent lid, or a common lid 17 shared by all the wells of a tray 12, or, in the case of another variant shown in FIG. 8, directly with the shelf 10 by means of grooves 46.

In the embodiment shown in FIG. 5, the lid 17 is common to both wells 13 and includes inward protrusions 17a whose peripheral edges 17b fit over the tops of the insulating barriers 16. In another embodiment, at B, FIG. 6, the cap 39 includes air pockets 41 to increase the insulation between the juxtaposed wells 13.

Owing to its monolithic character, the lid 17 can, when the meal tray is removed from the storage cabinet, be placed underneath the tray to form a smooth supporting surface, and its insulating character will protect the support on which the meal tray is placed from scorching by the base of the heated receptacle.

Figure 3:
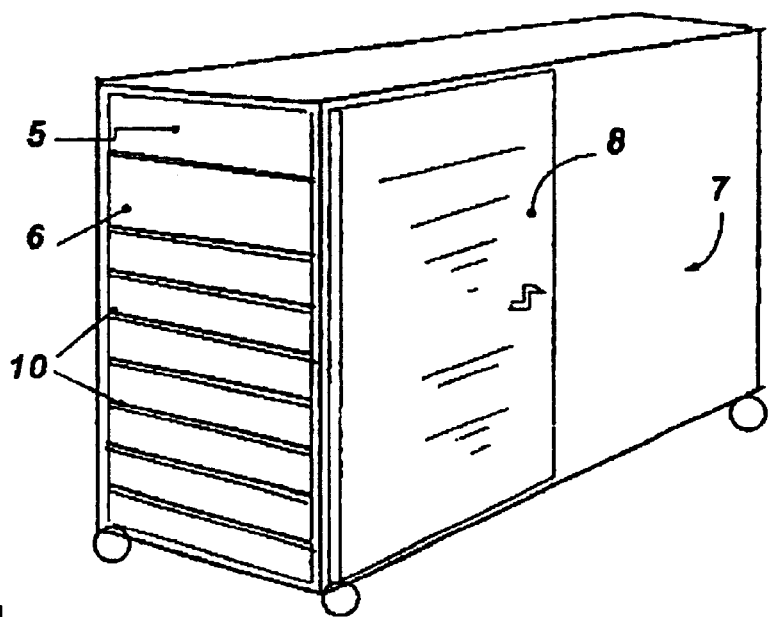
FIG. 3 is a perspective view of a trolley for carrying trays used in particular in in-flight catering.
Figure 4:
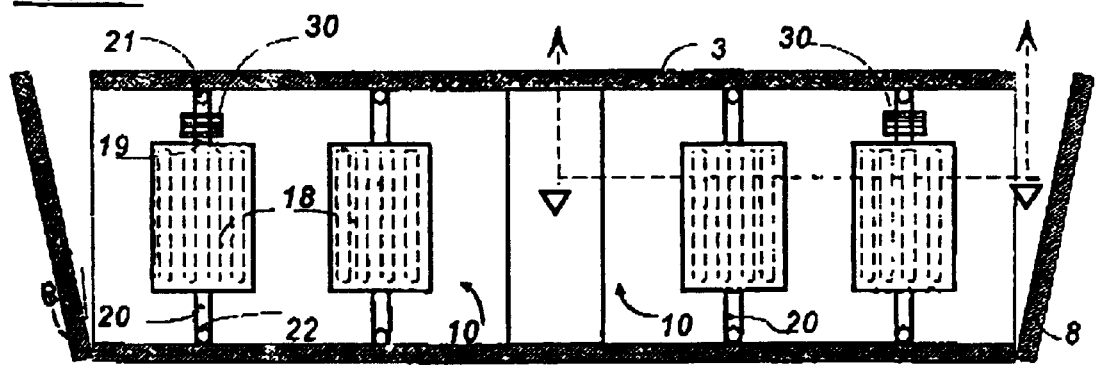
FIG. 4 is a cross section through the trolley shown in FIG. 3 with application of the arrangements according to the invention.

In storage cabinets these trays can be placed crosswise or lengthwise. In trolleys 7 for on-board catering, as shown in FIGS. 3 and 4, they are usually arranged lengthwise and from each end of the trolley.

One feature of the invention is that each of the shelves 10 comprises, in each of its areas supporting the bases of the receptacles 15 carried by the tray or trays 12, a heat pipe tubular heat exchanger 18. This heat exchanger is embedded in a housing in the shelf 10 in such a way that it comes into direct contact with the base of the tray, while at the same time being insulated from the tray beneath it. It may consist of an assembly of capillary or other tubes, or of an aluminum plate formed by two sheets drawn into the shape of the desired tubular network and assembled leaktightly against each other. In the case of the tray shown in FIG. 6, each shelf 10 therefore comprises two separate tubular heat exchangers 18 and each of these heat exchangers is connected by intermediate pipes 19 and 20 to vertical pipes 21 and 22, respectively, which respectively form the supply and return vertical branches of the refrigeration circuit of a heat pipe network.

As FIG. 1 shows, these vertical branches extend to the upper compartment 5 which contains the cold reservoir.

This reservoir consists of a leaktight box 23 whose base and side walls may be formed either from metal sheets or from heat pipe heat exchange plates, and which in any case contain other heat pipe heat exchangers, these various heat exchangers being interconnected.

Figure 2:
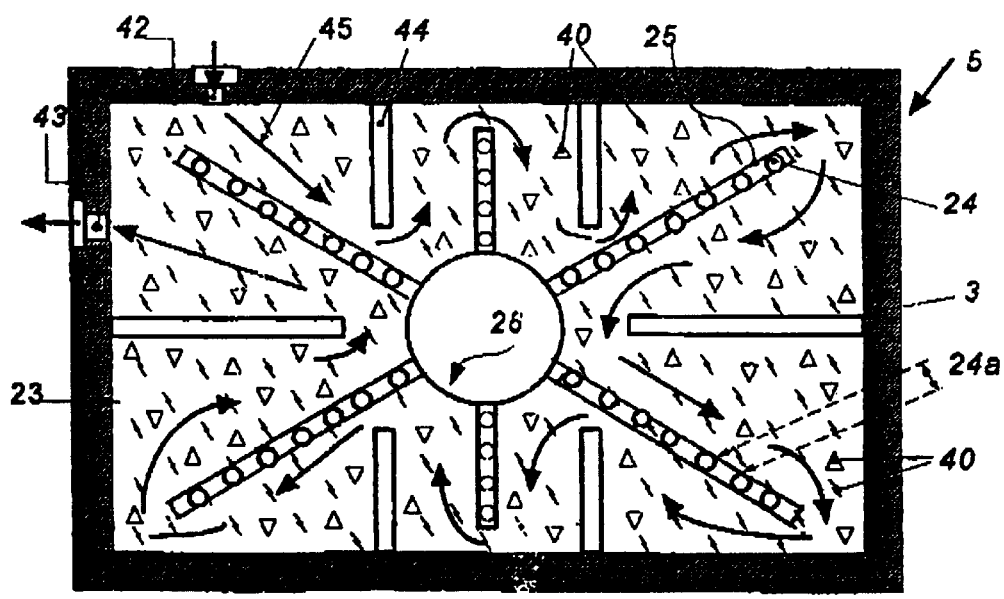
FIG. 2 is a cross section through the cabinet's cold reservoir.

In the embodiment shown in FIGS. 1 and 2, the tubular heat exchangers contained in the leaktight box 23 are composed of vertical tube bundles 24 projecting upwards from manifolds 25 that slope at an angle to the horizontal from the exterior toward the center of the compartment, and more precisely toward a buffer tank 26. FIG. 1 shows that the return branches 22 of the refrigeration circuit connect up with the tube bundles 24, while the supply branches 21 connect up, after passing through intermediate control valves 27, with the bottom of the buffer tank 26.

Each control valve 27 is equipped with an electrical control 35 which reacts, via a control box 36, to the information from one or more temperature sensors 37 that are each arranged in a shelf 10 close to a heat pipe heat exchanger 18.

As shown in FIG. 2, the manifolds 25 are arranged in a star arrangement around the buffer tank 26 and extend radially out, stopping short of the side walls of the box.

The tube bundles 24, the manifolds 25, the tank 26, the branches 21 and 22, the pipes 21 and the heat exchangers 18 make up a heat pipe network around which circulates a low-pressure refrigerating fluid transferring the heat upward from the bottom, following a principle that is well known in the state of the art.

In one embodiment the heating means consist of heating collars 30 arranged around the intermediate pipes 19 of the heat exchangers 18 for the cooling and heating of a receptacle. Each collar is housed in a housing 32 formed in the corresponding shelf. The various heating collars 30 are connected to a control box 33 which also drives the supply of the electrical control 34a of a shut-off valve 34 located on the supply branch 21 of the cooling circuit leading to the heat exchangers which must also heat the receptacles.

In operation, the cooling effect of the material—dry ice or a eutectic fluid at a low temperature—contained in the box 23 is passed on to the tubular heat-pipe networks 24 where it is conveyed through the heat-pipe network and, via the manifolds 25, into the buffer tank 26 which homogenizes the cold working fluid and divides it into the two supply branches 21. From here, by the principle of the heat pipe, the cold working fluid descends vertically into the tubular heat exchangers 18. The transfer is assisted by the fact that these heat exchangers slope at an angle of at least 3° to the horizontal from the outside in of each shelf. On contact with the base of the receptacles the cooling action is transmitted to the receptacles and then to the food they contain so that it does not spoil.

The heat extracted from the receptacle and from the food it contains vaporizes the fluid inside the heat-pipe network and the vapor rises back up to the heat reservoir along the return circuit. When the storage temperature is sufficient, the sensors 27 reduce the flow rate in the heat-pipe network or even shuts it off altogether to limit power consumption.

To heat the dishes, the heating collars are turned on and the valve 34 simultaneously closed. The cold working fluid now no longer reaches the corresponding branch 21 and the refrigeration circuit is interrupted. Each heating collar 30, surrounding an intermediate pipe 19, raises the latter to a temperature of around 70° C. which is transmitted to the fluid inside it and from there to the heat pipe tubular heat exchanger 18 laid out underneath the base of the receptacle 15. This temperature is sufficient to heat the dishes without spoiling the food. Because of the thermal barrier 14 and the lid 17, the heated receptacle is completely insulated from the other receptacle which is still cold, so that the heating does not disturb the cooling of the other dishes. If required, a sensor 38 is provided underneath each heat-pipe exchanger 18 to monitor and regulate the temperature.

When serving the food it is not essential to turn off the power to the heating collar 30 because, as FIG. 5 shows, the action of grasping the tray and withdrawing it from the shelf 10 terminates any contact between the base of the receptacle and the heat pipe tubular heat exchanger 18. The ability to maintain heating throughout the service is particularly useful when service is long, since it allows the food to be maintained at temperature until the operation is completed.

This installation, which has been described, with present-day methods of making a cold reservoir, is of more particular advantage if it uses sources of refrigeration consisting of hollow bodies 40 which are made of a good heat-conducting material and are leaktight, have a capacity of between 2 and 30 cm$^3$, contain a eutectic liquid whose freezing point is below 0° C. and have means of absorbing the increase in volume of the liquid as it freezes. Owing to their very high latent heat, such cold sources allow the maximum of refrigerating power to be accumulated in a small volume. In the application according to the invention, these cold bodies 40 are permanently imprisoned in the cold reservoir in suspension in a fluid whose freezing point is lower than that contained in each cold body.

For this purpose, and as shown in FIG. 2, the gap 24a between the tube bundles 24 of the manifolds 25 contained inside the cold reservoir is smaller than the size of the bodies 40 in order to limit the movements of these bodies and force them to come into contact with the exchange surface of the tubular network. Additionally, passing through the walls of the upper compartment 5 and of the box 23 are two pipes 42, 43 that can be closed with stoppers and can be connected, the first to a supply circuit, and the second to the return circuit of an installation for renewing the refrigerating capacity, that is, an installation which takes the fluid from the leaktight box and replaces it with a fluid having a temperature below the freezing point of the fluid contained in the cold bodies.

The box 23 also contains a number of approximately vertical plates 44 which project between the bundles 24 to form baffles which define, with these bundles, a preferred filling circuit, as shown by the arrows 45.

The use of these cold bodies 40 is highly advantageous because, when they contain a brine mixture containing 23% sodium chloride, they can be cooled to a freezing point of −23° C. by a refrigerant introduced into and flowing around the box at a temperature of between −40 and −50° C. The cold mass thus left in the box warms up much more slowly than dry ice and in a less violent manner. Furthermore, this slow warming up ensures steady refrigeration and reduces the amount of refrigerating capacity taken on board, and hence also the energy costs.

Lastly, and this is a very significant advantage, the resulting refrigerating activity emits no gas that could have any effect on man and can therefore be used for the storage of food in enclosed spaces.

Figure 7:
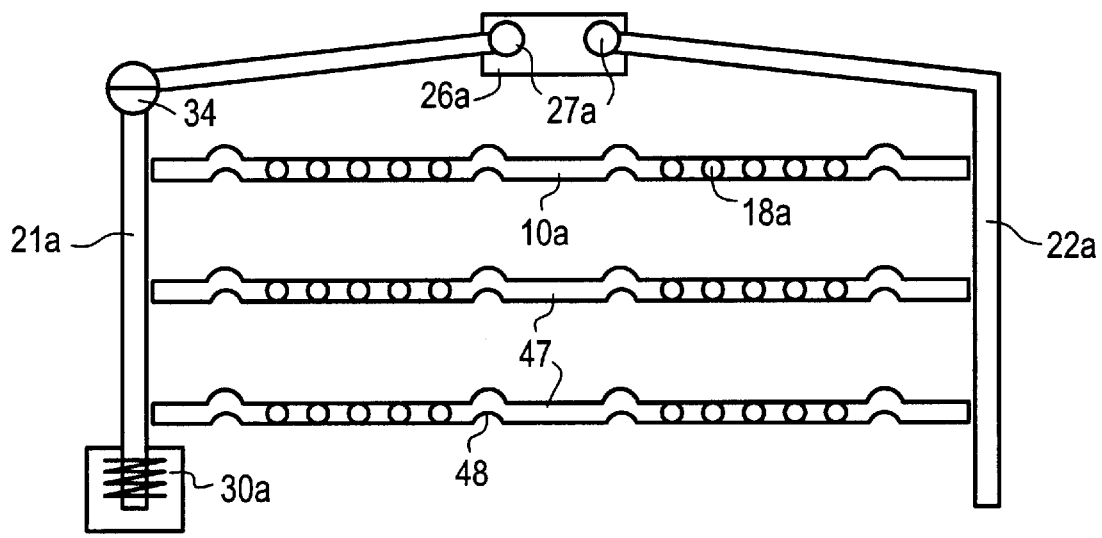
FIG. 7 is a partial view schematically showing the lower part of another embodiment of the refrigeration circuit.
Figure 8:
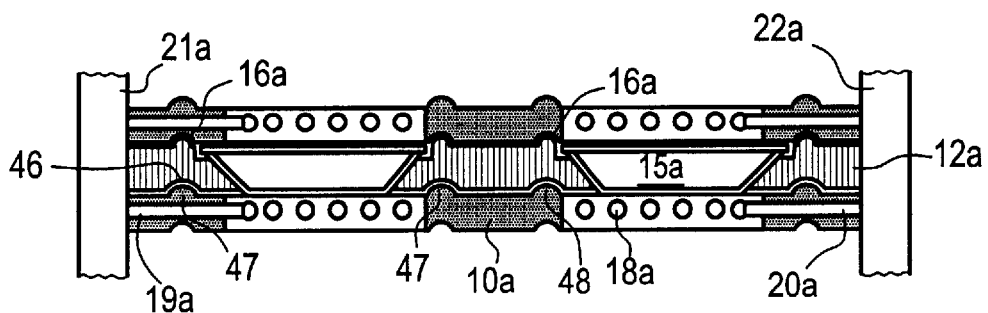
FIG. 8 is a partial view in cross section showing, on a larger scale, a meal tray when placed in the apparatus shown in FIG. 7.
Figure 9:
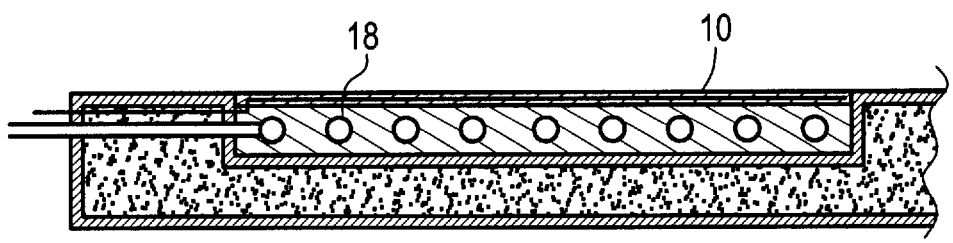
FIG. 9 is a partial view, on an enlarged scale, of a shelf showing a cross section of the embodiment of the tubular exchanger and heating means.

The embodiment illustrated in FIGS. 7 and 8 differs from the previous embodiment in the shapes of the trays and shelves. Parts common to both embodiments will be given the same references plus the index "a".

In this application, the housings formed in the shelves 10a to take the heat pipe tubular heat exchangers 18a are open both at the top and at the bottom in order that each heat exchanger 18a can not only come into contact with the base of a receptacle 15a but also extract heat from the interior of the next receptacle 15a down, which is not fitted with a lid.

The receptacles 15a are positioned in the same way in the wells of the insulating trays but these wells are surrounded by insulating barriers 16a in the form of circular humps, that is to say having a cross section of approximately semicircular form. These barriers are formed by longitudinal and transverse bars projecting from the upper surface of the tray 12a and coinciding with grooves 46 of complementary profile in the lower surface of the tray.

FIGS. 7 and 8 show that the shelves are provided with upper ribs 47 and with grooves 48 of complementary section to those of 16a and 46 mentioned above so as to engage with the latter.

Accordingly, when a tray 12a is inserted into the gap between two shelves 10a, its insulating barriers 16a are first compressed by the shelf above, and then, when they reach the grooves 48 of this shelf, they spring back to shape to snap-fit into contact with these grooves, giving thermal insulation to the well which they surround.

This arrangement makes it possible to dispense with the lids, reduce the interval between two shelves, and, without increasing the height of the trolley or cabinet, increase the number of trays that can be stored.

As shown in FIG. 7, the heat exchangers 18a which both keep the food by chilling it and heat the receptacles are provided, on their supply circuit 21a which includes a shut-off valve 34, with a single heating collar 30a which is located around the lower end of the branch 21a. This reduces the cost of the equipment and simplifies the manufacture of the electrical circuit.

During reheating, the radiation emitted by each heat exchanger toward the receptacle contributes to the heating of the food, but more importantly it deters the formation of condensation on the bottom of the shelf.

Figure 6:
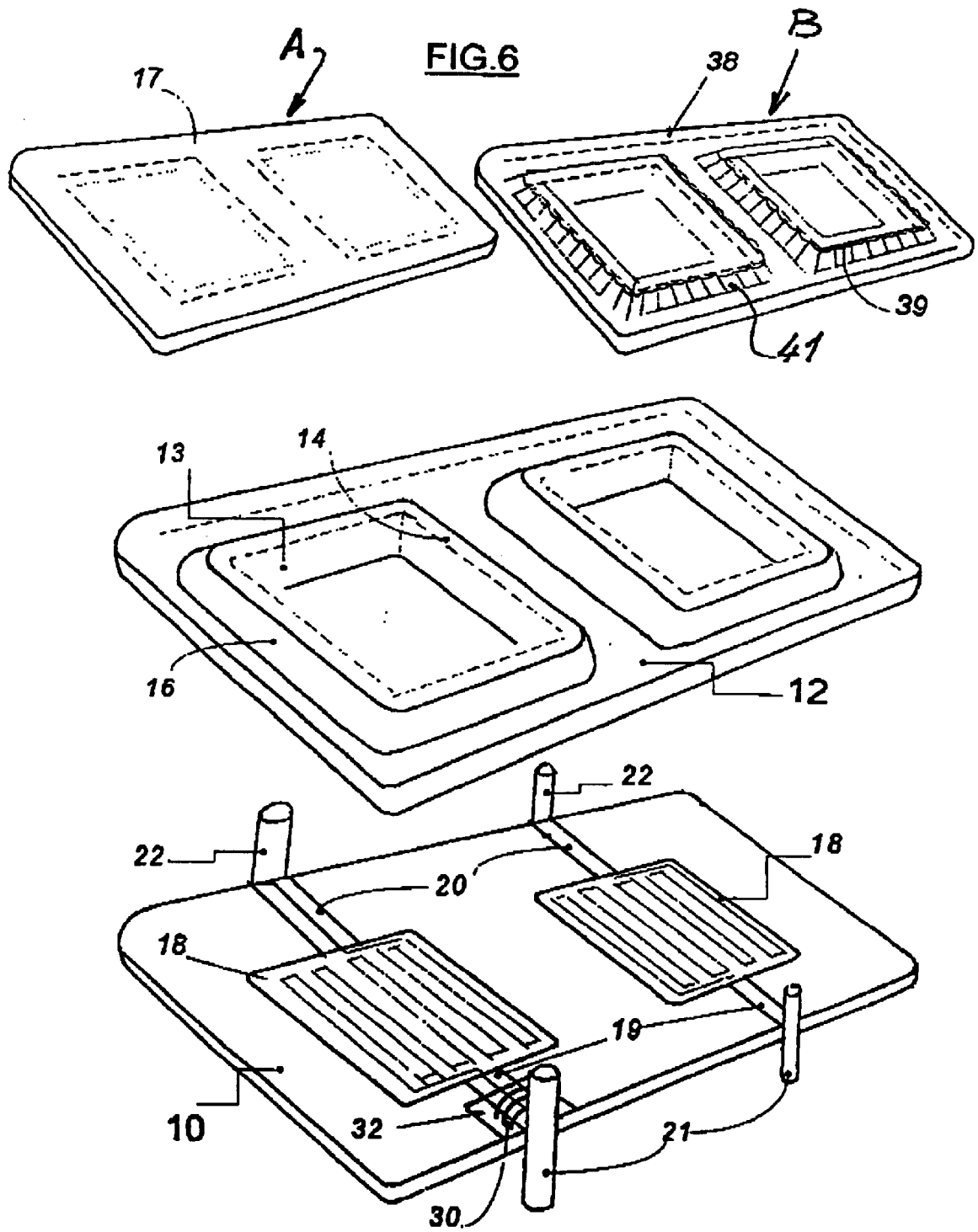
FIG. 6 is a perspective view showing the various parts of the tray and of the shelf supporting it with, at A, a lid for one variant and, at B, a cap for another variant with no lid.

In a variant, each tray 12 or 12a is covered by a cap 38, illustrated in FIG. 6, having forms homothetical to its own and fitting all its relief or indented profiles. Where it fits over the insulating barriers 16, 16a, this cap forms air pockets 39, which may in fact be augmented by local deformations to increase the insulation between juxtaposed wells. The cap is made from a synthetic material, in one or more layers, is insulating, and may include a decorative design on its upper surface. After the meal has been served the cap may be recovered, or may be used as a tray for serving and be thrown away. In the latter case it may include, in the cold storage well only, housings forming receptacles.

In another embodiment which is not shown, each of the heat pipe tubular heat exchangers 18 of each shelf 10 is contained in a plate made of a heat conducting material, for example cast aluminum. This plate is built into a housing in the insulating shelf 10 such that its upper surface comes into contact with the base of the receptacles of the trays. If the heat exchanger 18 is provided with electrical heating means, this heat exchanger is juxtaposed either with an electrical resistor embedded with itself in the plate, or with an electromagnetic inductor. The heat exchangers are connected, where they emerge from the plates, to the appropriate supply 20 and return 21 circuits, either rigidly and conventionally, or disconnectably. In the latter case the intermediate pipes 19 and 20 belonging to the supply 20 and return 21 circuits, respectively, engage in a connection box and, in this box, each has an end closed by a sloping wall designed to come into direct contact with the corresponding closed end, of complementary shape, of the sections of the heat pipe tubular heat exchanger 18. Contact is improved by a conducting lubricant in the box.

If the heat exchanger 18 of a plate is provided with an electrical resistor or other electrical heating means, connection to the electrical power supply is also disconnectable.

This arrangement simplifies construction and also maintenance, because in the event of malfunction only the defective element need be changed.

What is claimed is:

1. An installation for cold storage with localized reheating of food in meal trays, said installation comprising, a cabinet containing two superimposed and thermally insulated compartments, namely an upper compartment (5) forming a cold reservoir (9) and a storage compartment (6) fitted with shelves (10) to hold meal trays, and, also comprising meal trays (12) made of an insulating material with vertical through wells (13) in which receptacles (15) containing food can be positioned, each tray (12) optionally having at least one insulating lid (17), in which installation each shelf (10, 10a) is thermally insulating and comprises, in each areas supporting the base of the receptacles carried by the meal trays (12, 12a) which said shelf supports, a tubular heat pipe heat exchanger (18), each tubular heat pipe heat exchanger being connected by intermediate pipes (19, 20) to the supply (21, 21a) and return (22, 22a) branches, respectively, of a refrigerating heat pipe circuit, while at least one of the tubular heat pipe heat exchangers (18, 18a) in each shelf (10, 10a) is provided with electrical heating means (30, 30a), and the cold reservoir (9) consists of a leaktight box (23) made up of additional tubular heat exchangers and/or additional heat exchangers containing tubular heat pipe heat exchangers (24) with interconnected tubular networks which are connected, respectively, directly to the return branches (22, 22a) of the refrigerating heat pipe circuit and, via a buffer tank (26) that thermally homogenizes a cold working fluid circulating around the heat pipe circuit, to the supply branches (21, 21a) of the refrigating circuit.

2. An installation as claimed in claim 1 in which the additional tubular heat exchangers (24) contained in the leaktight box (23) of the cold reservoir (9) are composed of vertical tube bundles projecting up from manifolds (25) radiating out around the buffer tank (26) and descending toward the buffer.

3. An installation as claimed in claim 2, in which cold bodies (40), each consisting of a hollow body, and made of a leaktight material that is a good heat conductor, the cold bodies each having a capacity of between 2 and 30 cm$^3$ and containing a eutectic liquid whose freezing point is below 0° C., are in suspension in a fluid, having a freezing point that is lower than that of the fluid contained by the cold bodies, and suspended in the cold reservoir so as to be contact with the tube bundles (24) which secure them and contain them.

4. An installation as claimed in claim 3, in which the walls of the upper compartment (3) and of the leaktight box (23) of the cold reservoir (9) are traversed by two pipes (42, 43) that can be connected externally to the supply (21) and return (22) branches, respectively, of an installation for recharging the installation with a refrigerating fluid that is cooled to a temperature below the freezing point of the fluid contained in the cold bodies (40), while the walls of the box (23) support a number of substantially vertical internal plates (44) projecting between the bundles so as to form baffles which define, with these bundles, a preferred circuit for forcing the refrigerating fluid to circulate throughout the entire reservoir when the refrigerating capacity is being renewed.

5. An installation as claimed in claim 1, in which each of the supply branches (21, 21a) of the refrigeration circuit is fitted with an electrically operated control valve (27) which is operably connected and responsive to a temperature sensor (37) located in a shelf (10) near a heat pipe heat exchanger (18).

6. An installation according to claim 1, in which each of the supply branches (21) of the refrigeration circuit leading to the heat pipe heat exchangers (18) capable of supplying both refrigeration and heating is fitted with an electrically operated shut-off valve (34) controlled by a control means (33) for initiating the power supply to the heating collars (30).

7. An installation as claimed in claim 1, in which each of the through wells (13) formed in a tray (12) is surrounded by a barrier (16) made of an insulating material.

8. An installation as claimed in claim 1, in which each of the heat pipe heat exchangers (18) of each shelf (10) is embedded in a housing in the shelf while being insulated from the next tray down.

9. An installation as claimed in claim 1, in which each of the heat pipe heat exchangers (18a) of each shelf (10a) is situated in a housing in the shelf which is open at the top and bottom and in which the trays (12a) comprise, around the receptacle (15a) wells, thermal barriers (16a) having elastic deformability and capable of snap-fitting into grooves (48) on the lower surface of each insulating shelf (18a).

10. An installation as claimed in claim 1, in which the supply circuit (21a) of the heat exchangers (18, 18a) for both refrigerating and heating the food comprises a single heating collar (30a) arranged around the lower end of the supply circuit.

11. An installation as claimed in claim 7, in which each tray (12, 12a) is covered by a cap (38) made of a synthetic insulating material which matches its shapes and reliefs, and forms air pockets (39) around insulating barriers (16, 16a) to increase the insulation.

12. An installation as claimed in claim 1, in which each insulating shelf (10) comprises housings for a plate of heat-conducting material containing the heat pipe tubular heat exchanger (18), and the electrical heating means.

13. An installation as claimed in claim 12, in which each plate is removable and the ends of the lengths of each heat exchanger (18) that extend beyond a plate are closed and are in contact with the closed ends, of the corresponding intermediate pipes (19 and 20) of the supply (20) and return (22) circuits, respectively the closed ends being of complementary shape.

14. An installation according to claim 12, characterized in that the electrical heating means disposed in the cooling and heating rack is comprised of an electromagnetic inductor.

* * * * *